United States Patent [19]
Andreichev

[11] 3,790,349

[45] Feb. 5, 1974

[54] REACTOR FOR CATALYST PREPARATION

[76] Inventor: Pavel Petrovich Andreichev, pereulok Obukha, 4, kv. 4, Moscow, U.S.S.R.

[22] Filed: Sept. 4, 1970

[21] Appl. No.: 69,610

[52] U.S. Cl................ 23/284, 23/288 K, 23/283, 55/79, 55/390, 208/165, 208/168, 208/151, 252/418, 252/468, 432/58
[51] Int. Cl...................... B01j 11/06, B01j 11/18
[58] Field of Search.......... 23/284, 288 K, 252, 283; 55/79, 390; 208/165, 168, 150, 151; 252/418; 265/19 B

[56] References Cited
UNITED STATES PATENTS
2,348,156   5/1944   Sheppard........................ 208/150

Primary Examiner—James H. Tayman, Jr.
Attorney, Agent, or Firm—Holman & Stern

[57] ABSTRACT

A reactor for catalyst preparation by treating a granular stock material with a reducing gas which comprises a reaction chamber made as a vertical tube whose cross-section is reduced in the direction of the stock material flow, a chamber for drying and thermally treating the stock material, a chamber for cooling the catalyst, and a chamber for passivating the catalyst. The reactor is provided with preheating and heat-exchange devices. The reactor construction allows the drying, reduction, cooling, and passivation of the catalyst to be carried out in one apparatus by a continuous method.

1 Claim, 1 Drawing Figure

PATENTED FEB 5 1974
3,790,349
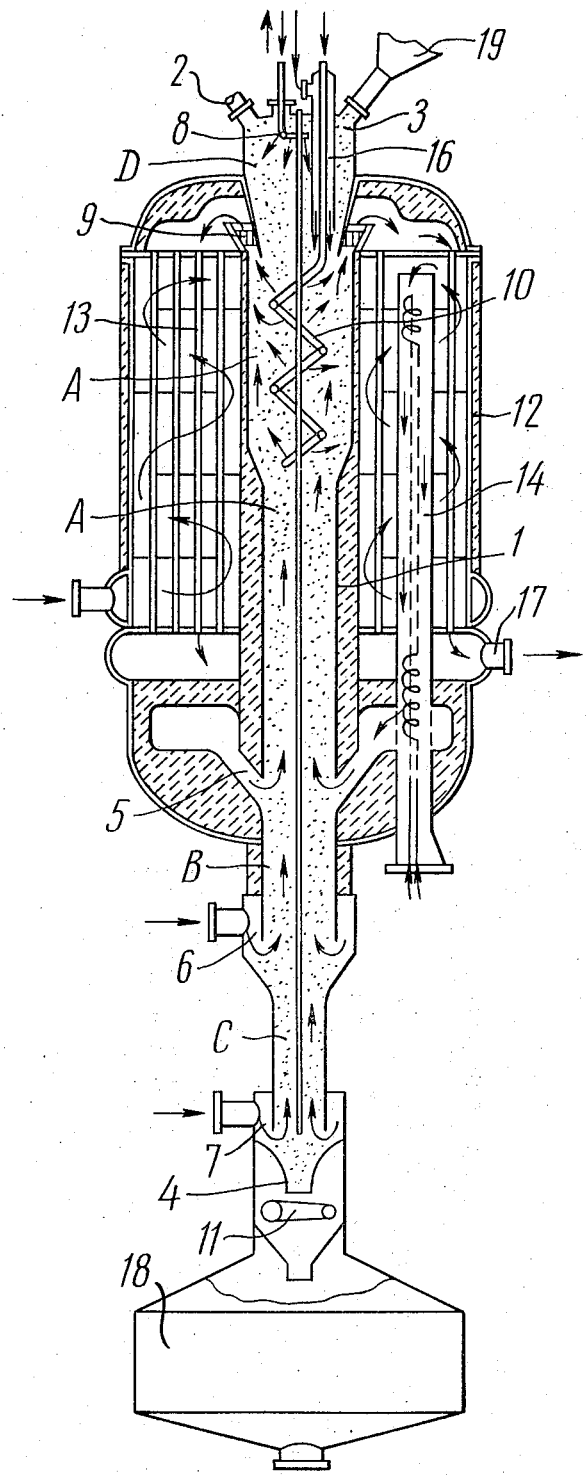
INVENTOR
Pavel Petrovich Andreichev
By Holman & Stern
ATTORNEYS

REACTOR FOR CATALYST PREPARATION

This invention relates to chemical engineering equipment and, more particularly, to reactors for the preparation of catalysts by treating a granular, oxide-type stock material with a reducing gas, preferably of catalysts intended for carrying out the synthesis of ammonia and alcohols, as well as for various hydrogenation reactions.

There is known a reactor for preparing a catalyst to be used for the synthesis of ammonia (cf. the article "Development of a Method for Reduction of Ammonia Synthesis Catalysts Outside Ammonia Converters" in the monograph "Fundamental Principles of Catalyst Selection and Manufacture," published by the Siberian Branch of the USSR Academy of Sciences, Novosibirsk, 1964, pp. 122–128).

The known reactor comprises a reaction chamber, a heat-transfer and a heating device, manholes for charging the oxide-type stock mixture and discharging the finished catalyst, and gas inlet and outlet means.

Into the reaction chamber is charged a granular, oxide-type stock material and preheated hydrogen or a hydrogen-containing gas is passed through said material, provision being made for raising the temperature of the gas by means of an electric heater as the process of stock material reduction progresses. The reduction process having been completed, the electric heater is deenergized and the temperature of the thus obtained catalyst is allowed to drop. If necessary, recourse may be had to a surface oxidation process (passivation) by treating the catalyst by a passivating gas fed into the reaction chamber via the reducing gas inlet means. The finished catalyst is discharged from the reactor.

The known reactor is a batch-type apparatus and, therefore, remains idle during charging and discharging operations, another disadvantage of the known reactor being that a considerable period of time is required for adjusting the process conditions and heating the material after each material charging operation. It is difficult to obtain in the known reactor a uniform catalyst having good quality characteristics, inasmuch as operating conditions vary from one material charging operation to another, and lower layers of the material are treated with the reducing gas containing an excessively high concentration of water vapour formed in the course of reducing the overlaying layers of the material. Moreover, the intermittent cycle of reaction operation precludes the possibility of automating the process of catalytic material preparation.

It is an object of the present invention to obviate the aforementioned disadvantages.

It is a further and more specific object of the present invention to provide a highly efficient reactor for the manufacture of catalysts which will make it possible to continuously treat the material under stable temperature conditions and at a steady rate of gas flow through the material being processed and, hence, to obtain a catalyst of superior quality during a much shorter process time.

This object is accomplished by the provision of a reactor for catalyst manufacture by treating a granular, oxide-type stock material by a reducing gas wherein, according to the invention, the reactor comprises a vertical tube having an inlet and an outlet opening for the material being processed, which material travels in the tube by gravity, and also having at least two reducing gas inlet manifolds disposed at different levels in the bottom part of the tube, and at least one gas discharge manifold in the top part of the tube.

It is expedient to provide in the reactor a passivating gas inlet manifold disposed below the reducing gas inlet manifolds.

It is preferable that the reactor be furnished with a gas medium inlet manifold located above the gas discharge manifold.

In the reactor provision may be made for a by-pass gas inlet manifold disposed between the gas discharge manifold and the upper reducing gas inlet manifold.

The method of catalyst preparation in the present reactor consists in that the reducing gas is fed into the bottom inlet manifold at a temperature of catalyst cooling and into the upper inlet manifold it is fed at a temperature slightly higher than that at the final stage of the catalyst reduction process.

The invention is illustrated hereinbelow by the description of an embodiment thereof given by way of example with reference to the accompanying drawing in which is shown a longitudinal sectional view of the reactor, according to the invention.

The reactor comprises a vertical tube 1, in the top part of which tube provision is made for stock material inlet openings 2 and 3, whereas the bottom part of tube 1 is furnished with a finished catalyst discharge opening 4.

Provision is made in the tube for gas inlet manifolds 5, 6, 7 and 8, and a gas discharge manifold 9. Disposed inside the tube is a by-pass gas inlet manifold 10.

Inside the tube close to opening 4 is disposed a means 11 for controlling the catalyst discharge rate made, for example, in the form of an endless belt.

The top part of tube 1 is enclosed in a jacket 12, which houses a heat exchanger 13 and an electric heater 14 for heating the reducing gas.

The reactor operates as follows.

The granular, oxide-type stock material enters vertical tube 1 of the reactor via openings 2 and 3 and descends in the tube by gravity.

Countercurrently to the descending material hot reducing gas preheated during passage through heat exchanger 13 and electric heater 14 is fed via manifold 5. Fed via manifold 6 is cold reducing gas, while manifold 7 supplies passivating gas (in the drawing, gas streams are shown by arrows).

In the chamber A located between manifolds 5 and 9, the oxide-type stock material undergoes reduction, while the chamber B disposed between manifolds 5 and 6 serves for cooling the catalyst, and the chamber C confined by manifolds 6 and 7 is intended for passivating the catalyst.

Passivation is resorted to only where the catalysts being prepared are pyrophoric, so that the chamber C can be dispensed with when preparing non-pyrophoric catalysts, e.g., a zinc-chromium catalyst.

In order to improve the quality characteristics of the target catalyst, the stock material should be subjected to heat treatment. To do so, into the reactor chamber D disposed between manifolds 8 and 9 is fed, via manifold 8, a gas intended for preheating and drying the stock materials before said material comes to the chamber A.

Selected stock materials, e.g., the material constituted by zinc and chromium oxides, apart from heating and drying, are subjected in the chamber D also to calcination effected by feeding into the chamber D either preheated reducing gas (via manifold 8) or preheated inert gas (via manifold 16), e.g., nitrogen, which mixes with the reducing gas in the bottom part of the chamber D. This gas mixture ascends through the stock material bed and leaves the reactor via manifold 8, which manifold serves in this instance as a discharge manifold.

In order to obtain a catalyst noted for its high quality, the initial stage of the oxide-type stock material reduction process should be carried out at a continuosly rising temperature of the process, the final stage of catalyst preparation being effected at a maximum temperature.

To smoothly raise the temperature of the material being processed at the initial stage of the reduction process, by-pass gas is introduced into the chamber A via manifold 10, said by-pass making it possible to control the temperature conditions at which the reduction process is conducted.

The chamber A should preferably be of a variable cross-section, a constriction in the bottom part of the chamber being instrumental in increasing the linear rate of gas flow at the ultimate stage of the reduction process and hence in providing (in case the catalyst being prepared is to be used for the synthesis of ammonia) for rapid discharge of water vapours which are formed in the course of the reaction and are capable of poisoning the catalyst.

In other instances, e.g., where the present reactor is employed for preparing zinc-chromium catalysts, increasing the linear velocity of the gas during the reduction process is beneficial in that it provides for a better dissipation of heat from the granules of the material being treated.

The gas that enters tube 1 via manifolds 5, 6, 7, 8 and 10 passes through the reactor, leaves the tube as a spent medium via manifold 9 and, on passage through heat exchanger 13, is discharged from the reactor via a connecting piece 17. The finished catalyst is collected in a bin 18.

The method of catalyst preparation in the reactor of the invention is illustrated hereinbelow by the following examples.

EXAMPLE 1.

The ammonia synthesis catalyst is prepared by treating a granular, oxide-type stock material constituted by iron oxides containing suitable promoter and stabilizing additives.

The stock material from two alternately operated feeders 19 flows by gravity to reactor tube 1 via openings 2 and 3 and descends in tube 1 also by gravity, passing consecutively through the preheating and drying chamber D, the reduction chamber A, the cooling chamber B, and the passivating chamber C.

Into the chamber C is fed, via manifold 7, the passivating gas having a temperature of 15°–35°C and taken in an amount of 1–5 percent based on the overall volume of the gas in the reactor, the passivating gas flowing countercurrently to the material. The passivating gas consists of a mixture of the gas with a passivating gas component. The passivating gas is prepared by introducing into the gas 0.6–1.5 volume percent of oxygen or 2–5 volume percent of steam, or a mixture of the two (0.3–1.0 volume percent oxygen and 2–3 volume percent steam). The proportion of the oxidizing component in the passivating gas is adjusted so that the oxidizing component will be completely absorbed by the catalyst during passivating gas passage through the chamber C and the gas leaving the chamber C enters the chamber B.

Fed into the chamber B via manifold 6 is the cooling reducing gas having a temperature of 15–35°C and the amount of the gas being 1–5 volume percent based on the overall amount of the gas in the reactor. In the lower part of the chamber B, the cooling reducing gas intermixes with the gas leaving the chamber C, passes through the catalyst, undergoes heating on contact with the catalyst and enters the chamber A.

The reducing gas directed into the chamber A via manifold 5 is heated to a temperature slightly greater than that at the final stage of the reducing process, the amount of the reducing gas being 75–85 volume percent based on the overall amount of the gas at the outlet of the reactor. Prior to entry into the chamber A, the gas is mixed with the gas that has passed through the chambers C and B, and the resulting mixture having A temperature of 500°–550°C comes to the bottom of the chamber A, in which there occurs the final stage of stock material reduction.

The reducing gas consists of hydrogen or use can be made of a hydrogen-containing gas, e.g., a nitrogen-hydrogen mixture.

In the chamber A, the reducing gas, as it passes through the oxide-type stock material, is gradually saturated with moisture that forms as a result of the reduction reaction. On leaving the chamber A, the reducing gas mixes with the countercurrent stream of the gas medium that flows out of the chamber D, and the resulting mixture having a temperature of 375°–450°C is withdrawn from tube 1 via manifold 9.

Into the chamber D, the reducing gas at a temperature 20°–100°C is fed concurrently with the stock material, the amount of the reducing gas being 0.5–2 volume percent based on the overall amount of the gas in the reactor.

In order to provide for favourable temperature conditions (the temperature of the material raises smoothly) during the initial stage of the reduction process, the bypass gas at a temperature of 15°–35°C and in an amount of 10–20 volume percent based on the overall amount of the gas in the reactor is fed via manifold 10 into the top part of the chamber A.

On being heated and dried in the chamber D, the oxide-type stock material to be reduced enters the chamber A, in which it flows downwards and contacts a progressively hotter and less water vapor saturated gas. The temperature of the stock material as it descends in the chamber A rises and the rate of reduction increases, the space velocity of the reducing gas increases in relation to the flowing layer of the material and the water vapor concentration in the gas reduces. As a result, the moving material meets progressively more favourable conditions, which ultimately make for the preparation of a highly active catalyst. The final stage of material processing takes place in the constricited part of the chamber A, in which the reducing gas has a minimum moisture content, the highest temperature and the maximum space velocity and increased linear velocity (as compared with the initial stage).

Insofar as all the material is processed under identical conditions, the degree of reduction will be uniform throughout the entire mass of the resulting catalyst.

From the chamber A, the catalyst enters the chamber B, in which it cools down.

The ammonia synthesis catalyst is pyrophoric and undergoes vigorous oxidiation by atmospheric oxygen. To prevent the catalyst from oxidation, it is subject to treating for the purpose of producing a protective oxide film on its surface. Catalyst passivation is effected in the passivating chamber C, in which the catalyst contacts the passivating gas.

Passivation process efficiency is enhanced due to the fact that passivation is carried out continuously by a countercurrent stream of the passivating gas. Under these conditions, the catalyst, as it descends in the chamber, contacts the passivating gas having a progressively increasing concentration of the passivating component, which is at a maximum when the finished catalyst emerges from the chamber C.

That the process of treating the catalyst with the passivating gas is conducted continuously, results in uniform passivating conditions throughout the catalyst mass and makes for passivation uniformity.

The finished catalyst is discharged from the reactor through outlet opening 4, the rate of catalyst discharge bein controlled by device 11, and collects in bin 18, from which the catalyst can be transferred to an appropriate site by means of, say, pneumatic conveyer.

EXAMPLE 2.

The methanol synthesis catalyst is prepared by treating a zinc and chromium oxide-containing stock material with a reducing gas.

The process of stock material treatment is essentially identical to that disclosed in Example 1 and comprises reducing the oxide-type stock material with a reducing gas, which is fed into the reactor via manifolds 5, 6, 8 and 10 counter-currently to the descending stock material. Spent gas is with drawn from reactor tube 1 via manifold 9.

The dissimilarity between the present process and the procedure of Example 1 consists in that the stock material is treated under different temperature conditions and the passivation stage is dispensed with, since the target zinc-chromium catalyst is not pyrophoric.

Another distinctive feature of the process is that the stock material, prior to entering the reducing chamber A, is subjected, apart from heating and drying, also to roasting at a temperature of 150°–270°C in an inert medium (or in an insert medium containing 5–25 volume percent of hydrogen). To roast the stock material, an inert medium e.g., nitrogen, is fed through manifold 16 and mixes in the bottom part of the chamber D with the reducing gas. The resulting gaseous mixture flows counter-currently to the descending stock material in the chamber D and leaves said chamber via manifold 8.

The process of reducing the stock material containing zinc and chromium oxides is accompanied by the evolution of heat which would be rapidly dissipated from the chamber A This goal is attained by carrying the process at high linear velocities (3–10 m/sec.) of the reducing gas stream. Where the stock material tends to spontaneous ignition due to overheating, an inert gas, such as nitrogen, may be fed through manifold 10 in order to rectify the situation.

The present reactor makes it possible to treat continuously granular oxide-type stock materials with a reducing gas and, therefore, provides for optimum temperature, and linear and space velocities in the course of the reduction process, as well as for uniform conditions throughout the entire mass of the catalyst being passivated. The aforesaid distinctive features are conductive to minimizing the duration of these processes and to obtaining uniform catalysts of superior quality.

The process of reducing additionally the passivated pyrophoric catalysts involves removing oxide films from the catalyst surface and is accomplished during warming-up the reactors, in which said catalysts are used, thereby increasing substantially the useful service time of the reactors in question.

The employment of the reactor provided by the invention reduces the duration of catalyst preparation by a factor of 2–5 due to carrying out simultaneously the principal manufacturing operations (stock material reduction, catalyst cooling and passivation), as well as due to the fact that stock material charging and target catalyst discharging operations involve no interruption of reactor operation.

I claim:

1. A reactor for continuous preparation of a catalyst comprising a vertically disposed tube defining a reaction chamber having a reduced cross-section in the lower portion thereof; stock inlet means in the upper end of said tube; catalyst outlet means at the lower end of said tube; at least two reducing gas inlet manifolds disposed at different levels in the lower portion of said tube; gas discharge means in the upper portion of said tube; a drying gas inlet manifold in the region of said stock inlet means; and a passivating gas inlet manifold in the lower portion of said tube between said reducing gas inlet manifolds and catalyst outlet means; said stock inlet means and said gas discharge means defining a preheating chamber portion of said tube; said gas discharge means and the uppermost of said reducing gas inlet manifolds defining a reduction chamber; said uppermost reducing gas inlet manifold and the lowermost of said reducing gas inlet manifolds defining a catalyst cooling chamber below said reduction chamber; and said lowermost reducing gas inlet manifold and said passivating gas inlet manifold defining a catalyst passivating chamber below said catalyst cooling chamber and above said catalyst outlet.

* * * * *